Feb. 24, 1970

L. H. LEONARD, JR 3,496,992

METHOD AND APPARATUS FOR HEATING AND COOLING

Filed May 25, 1961

*INVENTOR.*
LOUIS H. LEONARD JR.

BY *Frank R. Decker jr.*

ATTORNEY.

Feb. 24, 1970  L. H. LEONARD, JR  3,496,992
METHOD AND APPARATUS FOR HEATING AND COOLING
Filed May 25, 1961  5 Sheets-Sheet 2

*INVENTOR.*
LOUIS H. LEONARD JR.
BY Frank U. Decker Jr.

ATTORNEY.

INVENTOR.
LOUIS H. LEONARD JR.
BY Frank H. Decker Jr.

ATTORNEY.

INVENTOR.
LOUIS H. LEONARD JR.
BY *Frank U. Decker Jr.*
ATTORNEY.

3,496,992
Patented Feb. 24, 1970

3,496,992
METHOD AND APPARATUS FOR HEATING AND COOLING
Louis H. Leonard, Jr., Dewitt, N.Y., assignor to Carrier Corporation, Syracuse, N.Y., a corporation of Delaware
Filed May 25, 1961, Ser. No. 112,679
Int. Cl. F25b *13/00;* F01k *19/10;* F01n *3/04*
U.S. Cl. 165—2                                    39 Claims

ABSTRACT OF THE DISCLOSURE

A heating and cooling system having a direct contact evaporator, a steam boiler and a turbo-compressor. Refrigerant is evaporated in the evaporator to cool water in contact therewith and is compressed, condensed and returned to the evaporator. Water is heated in the boiler to supply steam to drive the turbo-compressor and the exhaust steam is condensed in a steam condenser. A low pressure chamber is provided between the turbine and compressor sections of the turbo-compressor to collect fluid leaking thereto which is passed to the steam condenser for separation of refrigerant from water and the evaporated refrigerant is returned to the evaporator.

---

This invention relates to refrigeration systems and particularly to refrigeration systems of the type that are adapted to provide either heating or cooling such as are desirable for use in air conditioning applications.

More particularly, this invention relates to a novel combination of elements in a heating and cooling system and to a method of operating such a system so as to achieve a relatively large capacity heating or cooling effect from a system which is compact in size and low in equipment cost.

Numerous systems have heretofore been proposed for providing refrigeration and air conditioning. Centrifugal refrigeration systems, absorption refrigeration systems, and reciprocating refrigeration systems have each enjoyed substantial success in applications to which they are uniquely adapted. However, each of these systems has technical limitations as well as cost disadvantages which limit their generalized use. In addition, these systems have not been altogether successful in providing both heating and cooling, particularly in applications where the heating load substantially exceeds the cooling requirements of the system, as is generally the case in air conditioning systems installed in cooler climates.

In many instances, the amount of heating which can be provided is limited by the capacity of the refrigeration compressor thereby necessitating a greatly over-sized compressor for adequate heating. These systems have the additional disadvantage that the compressor must operate at all times, thereby shortening its useful life and endangering reliability, especially on the heating cycle.

It is the principal object of this invention to provide a refrigeration system which is relatively inexpensive to manufacture and which at the same time overcomes many of the limitations which have heretofore been accepted in the design of prior systems. A preferred embodiment of the system to be described may be utilized for a wide range of applications by appropriate selection of the most economical and efficient components for the application desired. For example, it may be adapted to eliminate the necessity of an auxiliary heating system by being able to directly render any desired amount of heating irrespective of the amount of cooling which the system is designed to provide. A preferred embodiment of this invention is adapted for utilization as a hermetic, high speed, turbine driven, centrifugal, self-contained air conditioning unit.

This system may advantageously employ a high molecular weight refrigerant, a direct contact type evaporator, and air cooled condensers in a novel system which is relatively inexpensive to manufacture and adapted to a wide range of heating and cooling applications.

Accordingly, it is an object of this invention to provide an improved refrigeration system and method of operating the same.

It is a further object of this invention to provide an improved method and apparatus for refrigeration employing a direct contact evaporator.

It is a further object of this invention to provide an improved refrigeration system and a method of refrigeration which is capable of selectively providing both heating and cooling and wherein the heating cycle is independent of the compressor.

It is a further object of this invention to provide an improved refrigeration system embodying a high speed turbo-compressor.

It is a further object of this invention to provide an improved reheat system and method of obtaining reheat in an air conditioning system.

In an illustrated preferred embodiment, these and other objects are achieved by providing a direct contact evaporator having an emulsion of octofluorocyclobutane refrigerant and water therein. The refrigerant is withdrawn from the evaporator by the compressor section of a hermetic turbo-compressor, condensed and returned to the evaporator for re-evaporation therein. The water which has been chilled by heat exchange with refrigerant is passed through an external heat exchanger to provide cooling at a desired point and returned to the evaporator for rechilling. The refrigerant and water are intimately mixed by being emulsified in a jet ejector to obtain a relatively large area of mutual surface contact for heat transfer to take place in the direct contact evaporator.

A steam boiler is provided to supply steam to drive the turbine section of the turbo-compressor and the waste steam is condensed and returned to the boiler for reuse. Means are provided to supply chilled water from the evaporator or other suitable source to lubricate the bearings of the compressor and leakage through the compressor seals is directed toward a low pressure region from which the leaking and lubricant fluids are returned to the system for reuse. Means are also provided for passing refrigerant accumulated on the turbine side of the system back to the compressor side and for passing excess water on either side of the system back to the other side, thereby permitting a completely hermetic system. Means are further provided to pass steam into the evaporator instead of to the turbine to permit heating of the region to be conditioned when desired or for compressor overspeed protection.

These and other objects of this invention will become more apparent by referring to the following detailed description and attached drawings wherein.

Figure 1:
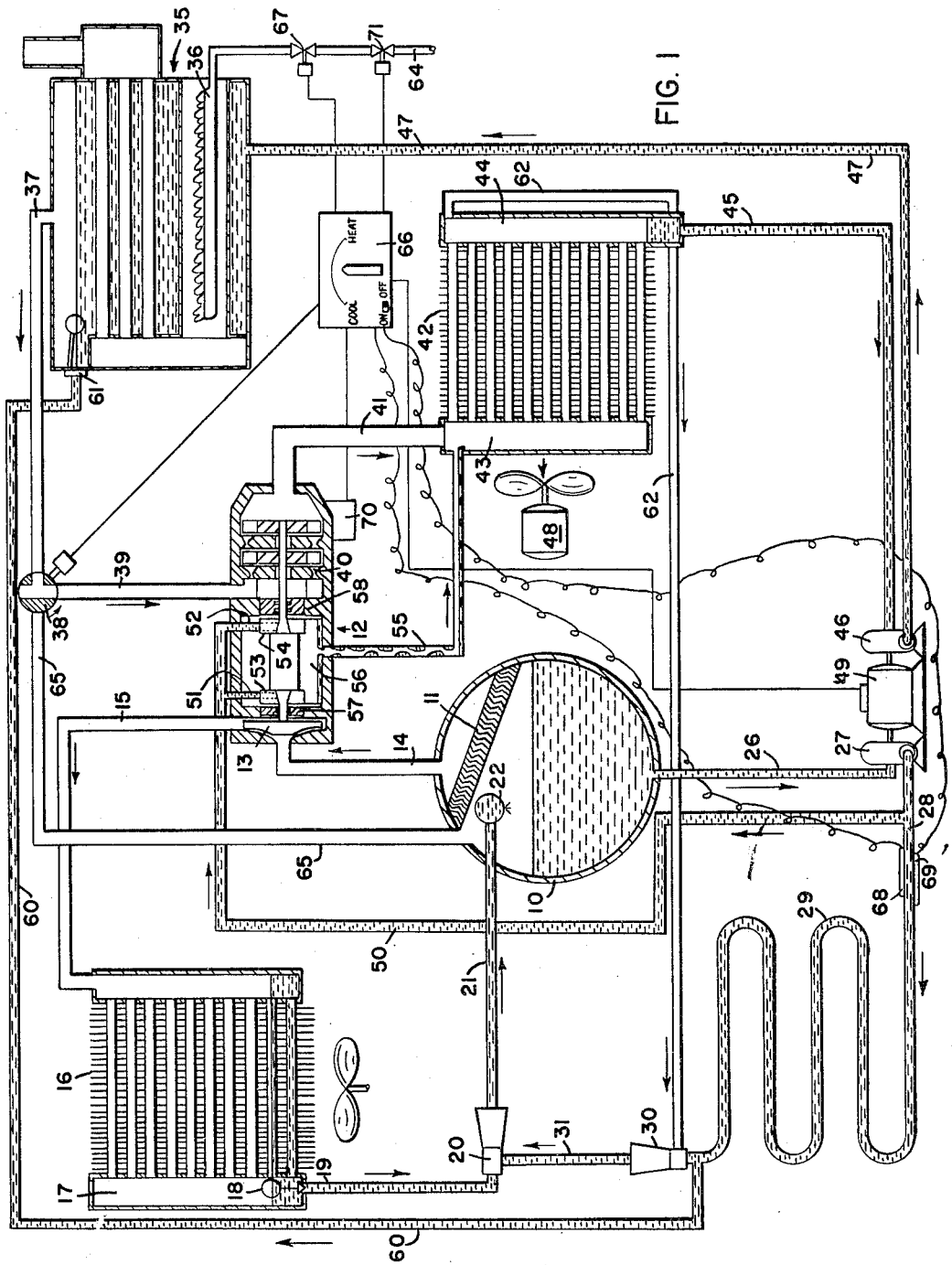
FIGURE 1 is a diagrammatic view, partially in cross-section, illustrating a preferred embodiment of a refrigeration system embodying the features of this invention.

Referring specifically to FIGURE 1, there is shown a direct contact type evaporator vessel 10 having an impingement type eliminator 11 to prevent entrained liquid from reaching compressor section 13 of turbo-compressor 12 through line 14. Refrigerant vapor is withdrawn from evaporator 10 by centrifugal compressor 13 and forwarded through line 15 to a header of condenser 16. Condenser 16 is desirably of the air cooled type and has a header 17 for accumulation of condensed refrigerant vapor.

Refrigerant vapor is condensed to a liquid by removal of heat from the vapor in condenser 16 and may be passed through a float valve 18, through line 19, into a jet ejector 20. Ejector 20 comprises a venturi tube in series with lines 19 and 21 through which refrigerant liquid is forwarded to spray header 22 in evaporator 10.

Since refrigerant liquid in condenser 16 is at a higher pressure than that maintained by compressor 13 in evaporator 10, some type of expansion means or refrigerant flow restriction should be interposed in the path of refrigerant returned from the condenser to the evaporator. This restriction or expansion means may comprise the restricted throat portion of the venturi in ejector 20, alone or in combination, with an optional float valve 18 or may comprise any other suitable type of expansion device in refrigerant return line 19. Likewise, return line 19 may be sized to provide the required restriction.

A heat exchange liquid, such as water, in evaporator 10 is passed through line 26 by pump 27 through line 28 and external heat exchanger 29 comprising a refrigeration load which may be located in the path of air to be conditioned. From external heat exchanger 29 the heat exchange liquid is passed through second ejector or venturi tube 30 and line 31 to the restricted throat of ejector 20. Ejector 20 emulsifies the water with the refrigerant returning from condenser 16 and the emulsion is passed through line 21 and spray header 22 into evaporator 10 for re-evaporation of the refrigerant and recooling of the heat exchange liquid. The resulting induction of heat exchange liquid through line 31, by reason of the restricted throat portion of ejector 20 to which it is connected, serves to reduce the head required to be pumped by pump 27. Other suitable means may be employed to emulsify the refrigerant and heat exchange liquids, but a jet ejector is particularly advantageous because it serves the triple functions of emulsification, reduction of the head required for the heat exchange liquid pump, and as a restriction device for the refrigerant returned from the condenser to the evaporator.

In order to emulsify the heat exchange liquid and the refrigerant it is necessary that the two liquids be substantially immiscible with respect to each other. For purposes of economy, it is desirable to utilize as little refrigerant as possible, and, accordingly, under normal cooling load operating conditions, a major fraction of the liquid passed through external heat exchanger 29 should comprise a relatively inexpensive heat exchange liquid such as water.

A suitable refrigerant for use in this system is preferably substantially immiscible with water and completely stable. Furthermore, the refrigerant should not react with water or decompose to form corrosive fluorine or chlorine compounds which are a major source of corrosion difficulties in conventional refrigeration systems. In addition, the vapor pressure of the refrigerant at an operating temperature of 40° F. should be substantially greater than that of water so that it readily vaporizes in preference to water in direct contact evaporator 10. A particularly suitable refrigerant for the system herein disclosed comprises a refrigerant–C318 having the formula c–$C_4F_8$ and known as octofluorocyclobutane. This refrigerant has a relatively high molecular weight and a minimum amount of refrigerant is required to be evaporated and a minimum head developed by compressor 13 to adequately cool the water in evaporator 10 for a given condensing temperature, making an inexpensive and desirable air cooled condenser feasible in this system.

Since the refrigerant is emulsified by ejector 20 with the water or other heat exchange liquid, the two fluids present a relatively large surface area of contact to each other for effective heat transfer to take place in the evaporator 10. This results in effective cooling of the water in the evaporator vessel and, at the same time, only a minor fraction of refrigerant is carried over into line 26 under normal refrigeration load conditions.

A boiler tank 35 containing a liquid power fluid and having a gas flame or other heat source 36 is provided to supply vaporized power fluid through outlet 37. The power fluid is desirably an inexpensive and an easily handled material such as water. Water is a desirable fluid because of the low pumping requirements for the condensate return pump. Under conditions where it is desired to provide cooling to the region to be conditioned, valve 38 is in the position shown in the drawing wherein steam or other vaporized power fluid is supplied from line 37 through line 39 to a turbine section 40 of turbo-compressor 12. The vaporized power fluid, having passed through turbine 40, is returned through line 41 to header 43 of condenser 42. The supply of heat to boiler 35 is controlled by modulating valve 67 and shut-off valve 71 which control the supply of gas or other fuel to burner 36 or otherwise control the supply of hot water, steam, or other heat source to boiler 35.

Condenser 42 liquefies the power fluid by removal of heat therefrom and the liquefied or condensed power fluid is passed from header 44 through line 45 and pump 46 through return line 47 back to the boiler tank to replenish the supply of power fluid in the boiler. If desired, pumps 46 and 27 may be a dual section hermetic pump driven by a single electric motor 49, such as disclosed in Leonard application Ser. No. 805,282, filed Apr. 9, 1959, and Patent No. 2,915,886, granted Dec. 8, 1959.

Figure 3:
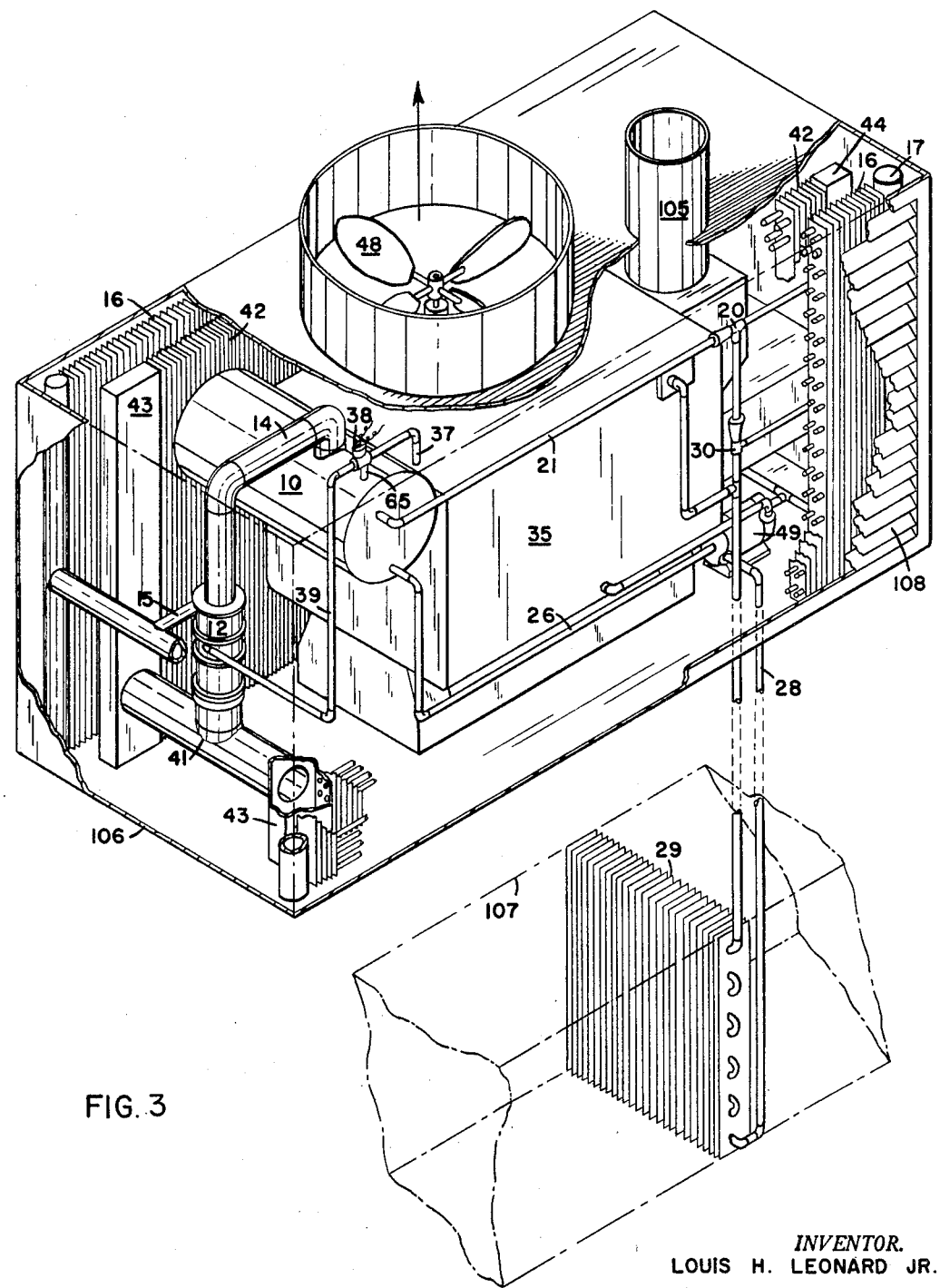
FIGURE 3 is an elevational view partly broken away of a complete heating and cooling system utilizing air cooled condensers in accordance with the preferred embodiment of this invention.

As shown in FIGURE 3, condenser 42 is desirably of the air cooled type through which air is drawn by fan 48. Since the temperature at which the refrigerant in condenser 16 liquefies is generally lower than the temperature at which the power fluid in condenser 42 liquefies, it is convenient and desirable to physically locate the two condensers adjacent each other so that ambient air flows first across the heat exchange portion of condenser 16 and then across the heat exchange portion of condenser 42 from which it passes through fan 48 and is discharged to the atmosphere.

FIGURE 3 illustrates an arrangement of components for the preferred embodiment of this invention. Each of the components illustrated in FIGURE 1 may be enclosed within a unitary housing 106 with the exception of external heat exchange coil 29. Heat exchange coil 29 comprises the heating or cooling load, such as an air stream to be conditioned, and may be located in an air conditioning duct 107, as in the case of a central station unit, or may be located directly in the region to be conditioned. Unitary housing 106 may be suitably located on the rooftop of a building or in any other desired location and is provided with flue 105 in the case of a gas fired boiler. As will be seen from FIGURE 3, condensers 16 and 42 may be of a dual or split type and half of each condenser is located on opposite sides of unitary housing 106. Louvers 108 on the opposite sides of the housing 106 admit air into the housing and the air is exhausted through a stack at the top of the housing by fan 48. By this means, a single fan is enabled to serve as an air moving means for both condensers 16 and 42. Since the condensing temperature in condenser 42 is higher than the condensing temperature in condenser 16, condenser 42 is located inwardly of the housing and is therefore in heat exchange relation with the warmer air which has passed through condenser 16. By this means, the coolest air is in heat exchange relation with condenser 16 having the lower condensing temperature, thereby resulting in an efficient air cooled arrangement and a highly compact heating and cooling unit as shown in FIGURE 3.

Figure 2:
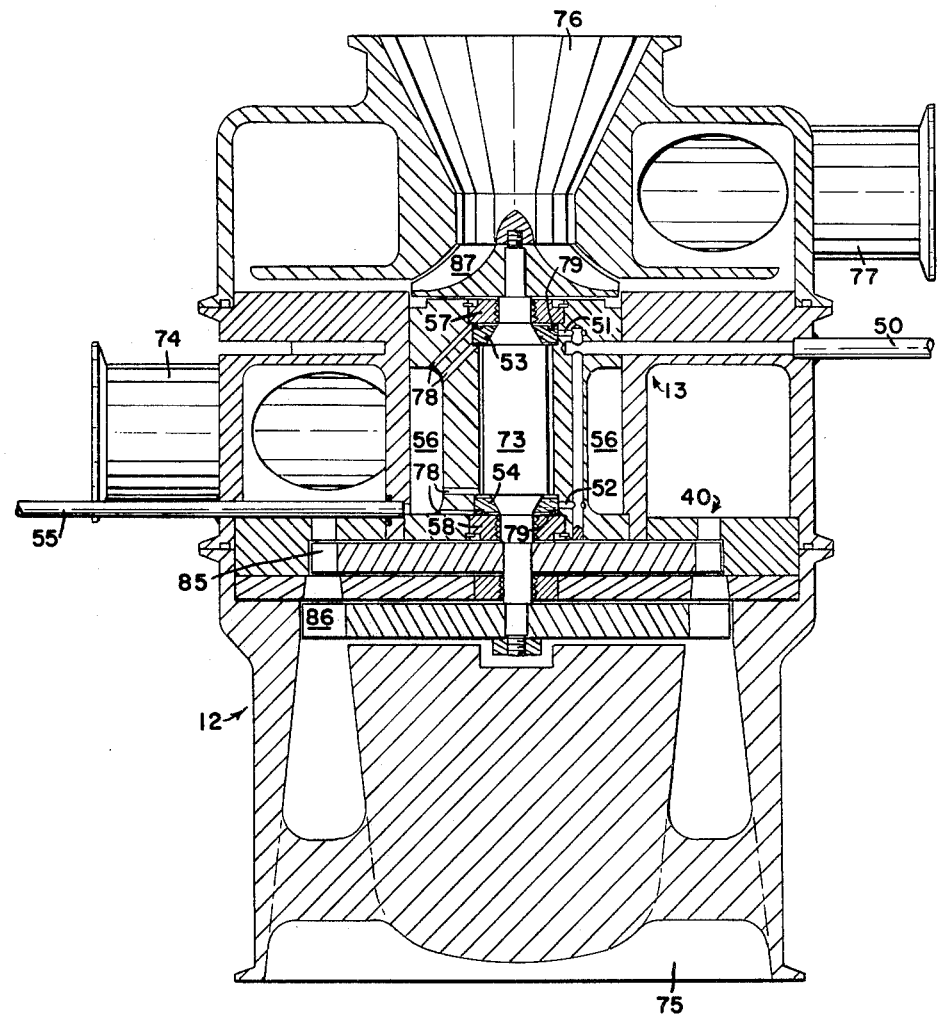
FIGURE 2 is a cross-sectional view through a turbo-compressor suitable for use in the preferred embodiment of this invention.

As shown in FIGURE 2, turbo-compressor 12 is desirably a completely hermetic centrifugal unit having spaced bearings 53 and 54 and spaced seals 57 and 58 disposed along a shaft 73 joining compressor section 13 with turbine section 40. In order to obtain high efficiency and large capacity from a small size compressor impeller, it is preferable to operate the turbo-compressor at a relatively high speed on the order of 30,000 r.p.m. To minimize the lack of concentricity caused by bearing wear at these high speeds, it is desirable to use spring loaded tapered bearings of the type disclosed in Leonard application Ser. No. 805,282, filed Apr. 9, 1959.

Turbine section 40 of compressor 12 is shown to comprise a two-stage turbine. Inlet 74 admits steam into the first stage of the turbine and is connected to steam line 39. Steam passes from a first impeller 85 through a set of stationary vanes to second impeller 86 from which it is discharged to outlet 75 which communicates with steam condenser 42 through line 41. A labyrinth seal 58 mates with and closely surrounds the turbine end of shaft 73 to prevent steam from passing to compressor section 13 of the turbo-compressor. A bearing 54 having a tapered portion mating with a correspondingly tapered portion on shaft 73 is spring loaded by Belleville washers 79. This arrangement maintains concentricity of shaft 73 in spite of wear which may develop in time.

Inlet 76 communicates with compressor section 13 of the turbo-compressor having impeller 87 and is connected to evaporator 10 through line 14. Outlet 77 of compresor section 13 communicates with refrigerant condenser 16 through line 15. A tapered bearing 53 is spring loaded by Belleville washers 79 and mates with a tapered portion of shaft 73 for supporting the compressor end of the shaft. A labyrinth seal 57 mates with and closely surrounds shaft 73 to prevent refrigerant from passing to the turbine side of the turbo-compressor.

A lubricant line 50 supplies cooled water or other heat exchange liquid from evaporator 10 to lines 51 and 52 for lubricating bearings 57 and 58 respectively. Alternatively, cooled water or other heat exchange liquid may be supplied from condenser 42 or some other system fluid such as refrigerant may be utilized as a bearing lubricant. The use of cooled water as a lubricant is especially desirable because of its relatively greater viscosity which results in better lubricating properties. Another line 55 which communicates with a low pressure region of the refrigeration system such as condenser 42 communicates with chamber 56 and with the portions of the turbo-compressor between seals 57 and 58 through passages 78. Consequently, a low pressure region is formed around the seals and bearings and along shaft 73 between seals 57 and 58. This region is preferably at a lower pressure than that of the refrigerant on the compressor side of the system and also at a lower pressure than the steam on the turbine side of the system. Steam or refrigerant which leaks past seal 58 or 57 is conducted through passages 78 to low pressure region 56 and thence through line 55 where these fluids are returned to the refrigeration system for reuse therein. In addition, lubricant liquid which is supplied through line 50 to the bearings is also drained from the compressor through line 55 by the same means.

This arrangement is paticularly advantageous in a high speed turbo-compressor because one of the major obstacles to the effective use of such a compressor is the difficulty of providing an adequate seal between the compressor and turbine sections that operates effectively at high speeds. The construction shown in FIGURE 2 greatly reduces the necessity for a perfect seal at high speeds by making provision for withdrawing leaking fluids from the region between the seals and the compressor. Furthermore, in the system described, leakage of small quantities of steam to the refrigeration side of the system does not result in injury or corrosion of the refrigeration system because water is present on the refrigeration side of the system during normal operation. Consequently, the usual requirement of a perfect seal between the compressor and turbine sections of the turbo-compressor is obviated since no substantial harm or impairment to the system results from slight leakage through the turbine. This allows the use of simple, inexpensive labyrinth seals between the sections of the turbo-compressor.

In normal operation, the pressure in the low pressure region 56 of turbo-compressor 12 is lower than the pressure in either the compressor or turbine sections and, consequently, direct leakage from one section to the other is eliminated or greatly reduced; that leakage which does take place through the seals is passed through line 55 to condenser 42 together with the lubricant fluid supplied to the bearings.

Figure 6:
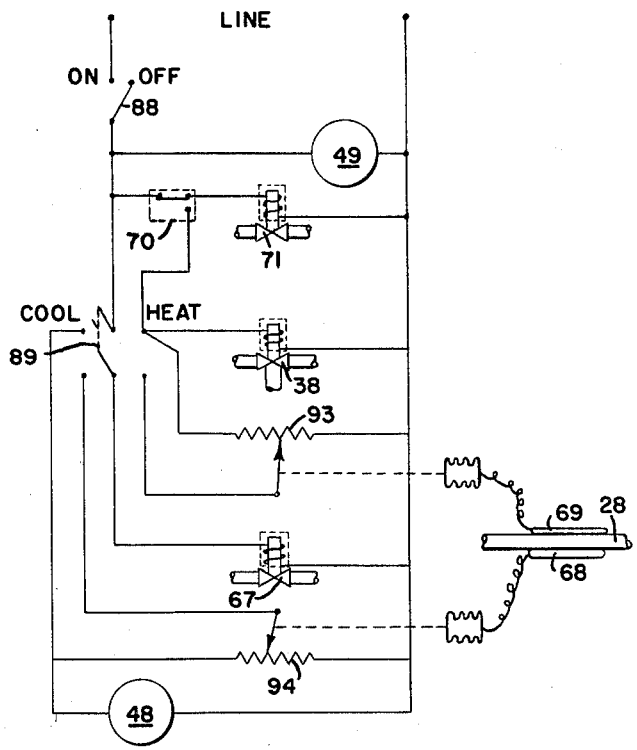
FIGURE 6 is a schematic view of an electric control system suitable for use with this invention.

A control circuit suitable for use with the present system is schematically shown in FIGURE 6. On-off switch 88 controls the supply of electricity to the various controls. A second switch 89 is provided for change-over from heating to cooling as desired. It will be understood that switches 88 and 89 may be approximately combined into a single switch and suitable thermostatic means may be provided to make the change-over operation automatic if desired.

Pump 49 is connected across the line at all times and operates whenever switch 88 is closed. Gas shut-off valve 71 is actuated by over-speed control 70 on the turbine. When the over-speed control senses an excessive turbine speed switch 70 opens to deenergize the solenoid of shut-off valve 71 thereby closing the valve and terminating the supply of fuel or other heat source to boiler 35. At the same time, control 70 closes the contact connected to diverting valve 38 thereby terminating the supply of steam to the turbo-compressor and instantly stopping it to prevent damage to the system.

In normal cooling cycle operation thermostat bulb 68 on line 28 controls potentiometer 94, which in turn determines the proper orifice opening of modulating gas valve 67. When switch 89 is in the cooling position, the solenoid of diverting valve 38 is deenergized and the valve is thereby rotated to a position such that steam is supplied to the turbine section of the turbo-compressor. It will be noted that fan motor 48 operates at all times on the cooling cycle and is shut off on the heating cycle.

When change-over switch 89 is in the heating position, diverting valve 38 is energized and rotated to a position such that the supply of steam to the turbine section of the turbo-compressor is terminated and steam is supplied directly through line 65 to evaporator 10. When change-over switch 89 is in the heating position, the orifice opening of modulating gas valve 67 is controlled by potentiometer 93, which in turn is set by an appropriate actuating mechanism by bulb 69 on line 28.

When it is desired to provide heat to the region to be conditioned, valve 38 is rotated to a position which terminates the supply of steam to the turbine through line 39, and steam or other power fluid is passed directly into direct contact evaporator vessel 10 through line 65. The steam then condenses and gives up its heat to the water in evaporator 10. Consequently, pump 27 supplies heated water to heat exchanger 29 to provide heat to the area to be conditioned.

In order to maintain the liquid level of water in boiler 35 above the level of the flue gas tubes therein, a float valve 61 is provided in line 60 which is connected to the outlet of a heat exchanger 29. When the level of liquid in the boiler tank drops below a predetermined height, valve 61 opens and pump 27 forwards water from evaporator 10 through heat exchanger 29 to replenish the supply of water in boiler 35. Likewise, if excess water accumulates in the boiler, float valve 61 will open and return it to evaporator 10.

In order to return refrigerant vapor which may accumulate in the turbine side of the refrigeration system, a purge line 62 is connected to a relatively cool, low pressure region of header 44 where refrigerant vapor tends to accumulate and connects to the throat portion of the venturi tube 30. Passage of heat exchange fluid through venturi 30 continually purges header 44 of vaporized refrigerant and returns it to the compressor side of the refrigeration system when it is on the cooling cycle.

In operation, with control circuit 66 in the cooling position, when it is desired to cool the region to be conditioned, octofluorocyclobutane is evaporated from direct contact evaporator 10 providing a temperature of about 45° F. at a pressure of approximately 23 p.s.i.a. in the evaporator. Since this pressure is above the ambient atmospheric pressure, air leakage into the compressor side of the system is effectively prevented. Refrigerant vapor is withdrawn from the evaporator by compressor 13, compressed, and forwarded to condenser 16. Air is drawn through air cooled condenser 16 by fan 48 thereby removing heat from the refrigerant and condensing it at a temperature of 125° F. and a pressure of 90 p.s.i.a. Condensed or liquefied refrigerant is passed through ejector 20 where it is emulsified with water supplied to the region to be conditioned, from heat exchanger 29. The resulting emulsion is returned to evaporator 10 for recooling and recirculation of the water.

Steam is generated in boiler 35 at a pressure of 100 p.s.i.a. and a temperature of 328° F., and is forwarded through line 39 to turbine section 40. The steam passes through the stages of turbine section 40 to drive compressor section 13 of the turbo-compressor. Steam is discharged from the last stage of turbine 40 and is condensed in air cooled condenser 42 at a temperature of 142° F. and a pressure of 3 p.s.i.a. It will be noted that the temperature and pressure of heat exchange fluid passing through venturi tube 30 is sufficiently lower than the temperature and pressure of refrigerant vapor which accumulates in cold header 44 of condenser 42, so that refrigerant vapor is induced from header 44 through line 62 to the low pressure region in the throat of venturi 30 where it is returned through line 31 and ejector 20 to evaporator 10. If the level of water in boiler 35 rises above or drops below the predetermined level at which float valve 61 opens, water will pass through line 60 until the desired level is attained in boiler 35.

The speed of compressor 13, and consequently the cooling capacity of the system, is governed by the amount of steam supplied to turbine 40 through line 39, which in turn is controlled by the gas supplied through gas line 64 and modulating valve 67 to burner 36. Modulating valve 67 is controlled by thermostatic means such as bulb 68 when it is desired to supply a cooling to the load conditioned by heat exchanger 29. If the thermostatic bulb senses that the temperature of the water passing through line 28 to too high, valve 67 opens to allow more gas to burner 36, which results in more steam being forwarded to turbine 40 and increases the speed of compressor 13 to provide additional refrigeration capacity. When the cooling load in the region to be conditioned drops, the temperature of water supplied through line 28 drops. The drop in temperature below the predetermined desired temperature is sensed by thermostatic bulb 68 on line 28 and modulating valve 67 reduces the supply of gas to burner 36, which, in turn, results in less steam being supplied to the turbine and a consequent reduction in the speed of compressor 13, thereby lessening the capacity of the refrigeration system.

In the event of malfunctioning of the system such that the load on compressor 13 is greatly reduced, an over-speed control 70 senses the over-speed condition of turbine 40. This condition actuates a control circuit 66 which operates valve 38 to terminate the supply of steam to the turbine and the steam may be passed directly to evaporator 10 to dissipate it. In addition, shut-off valve 71 may be actuated to terminate the supply of gas to burner 36.

When it is desired to supply heat to the region to be conditioned, control circuit 66 is set to the heating position which actuates valve 38 so that steam is supplied from boiler 35 at a pressure of 105 p.s.i.a., due mostly to refrigerant pressure, directly to evaporator 10 instead of to the turbine. The steam condenses in and heats the water in evaporator 10. The heated water is then supplied by pump 27 to heat exchanger 29 to heat the region to be conditioned. Under these conditions, the pressure in boiler 35 is increased by the presence of evaporated refrigerant on the turbine side of the system tending to inhibit leakage of ambient air into that side of the system. Control of the heating cycle is afforded by bulb 69 controlling gas flow through valve 67.

Figure 4:
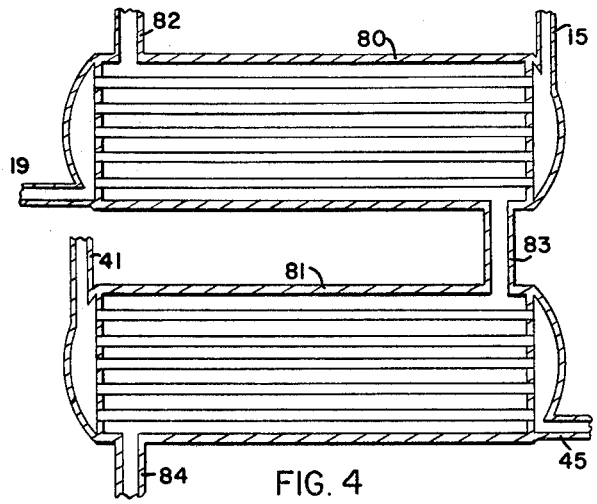
FIGURE 4 is a cross-sectional view of a pair of water cooled condensers suitable for use with this invention.

A modified condenser construction is shown in FIGURE 4 wherein a water cooled refrigerant condenser 80 and a water cooled steam condenser 81 are provided. A cooling water inlet 82 is provided for a suitable source of cold water, such as a cooling tower. The cooling water is first passed over a tube bundle in refrigerant condenser 80 and then passed through line 83 over a tube bundle in steam condenser 81. Outlet 84 is provided for returning the cooling water to the cooling tower. Line 15 supplies refrigerant to the tube bundle in condenser 80 and the condensed refrigerant is passed through line 19 back to evaporator 10. Inlet line 41 admits waste steam from the turbine into the tube bundle in condenser 81 and the condensed steam is passed through line 45 back to the boiler for reheat. It will be seen, therefore, that the system described may utilize a water cooled condenser, if desired, with relatively minor modifications. Similarly, an evaporatively cooled condenser may be substituted for either or both condensers 16 and 42 if desired.

While the system shown in FIGURE 1 is illustrated as having a gas burner as the heat source for operation of boiler 45, it will be understood that this is merely illustrative of a preferred heat source and any suitable heat source may be used in place of the gas burner illustrated. For example, in many locations, electricity or a source of hot water or steam is readily available and may be utilized to supply heat to boiler 35 by appropriate selection of a boiler adapted to utilize whatever source of heat it is found most convenient or economical to use.

Figure 5:
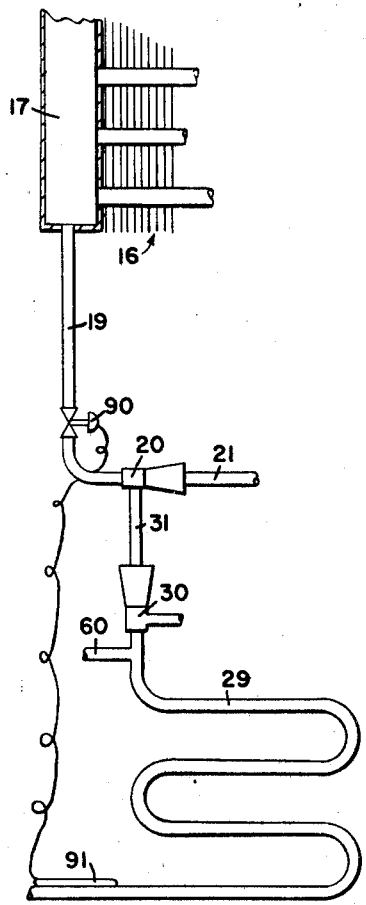
FIGURE 5 is a schematic illustration of a modified refrigerant flow control means.

FIGURE 5 illustrates a modified refrigerant control system wherein a thermal expansion valve 90 which is actuated by bulb 91 located at the outlet of heat exchange coil 29 serves as the restricted means for controlling the flow of refrigerant through ejector 20 and line 21 to evaporator 10. In this system, float valve 18 may be eliminated from header 17 of condenser 16. By proper sizing of the restricted throat portion of ejector 20, thermal expansion valve 90 may be omitted and the refrigeration system may operate with a fixed refrigerant flow restriction comprising the restricted orifice of the throat portion of ejector 20.

Figure 7:
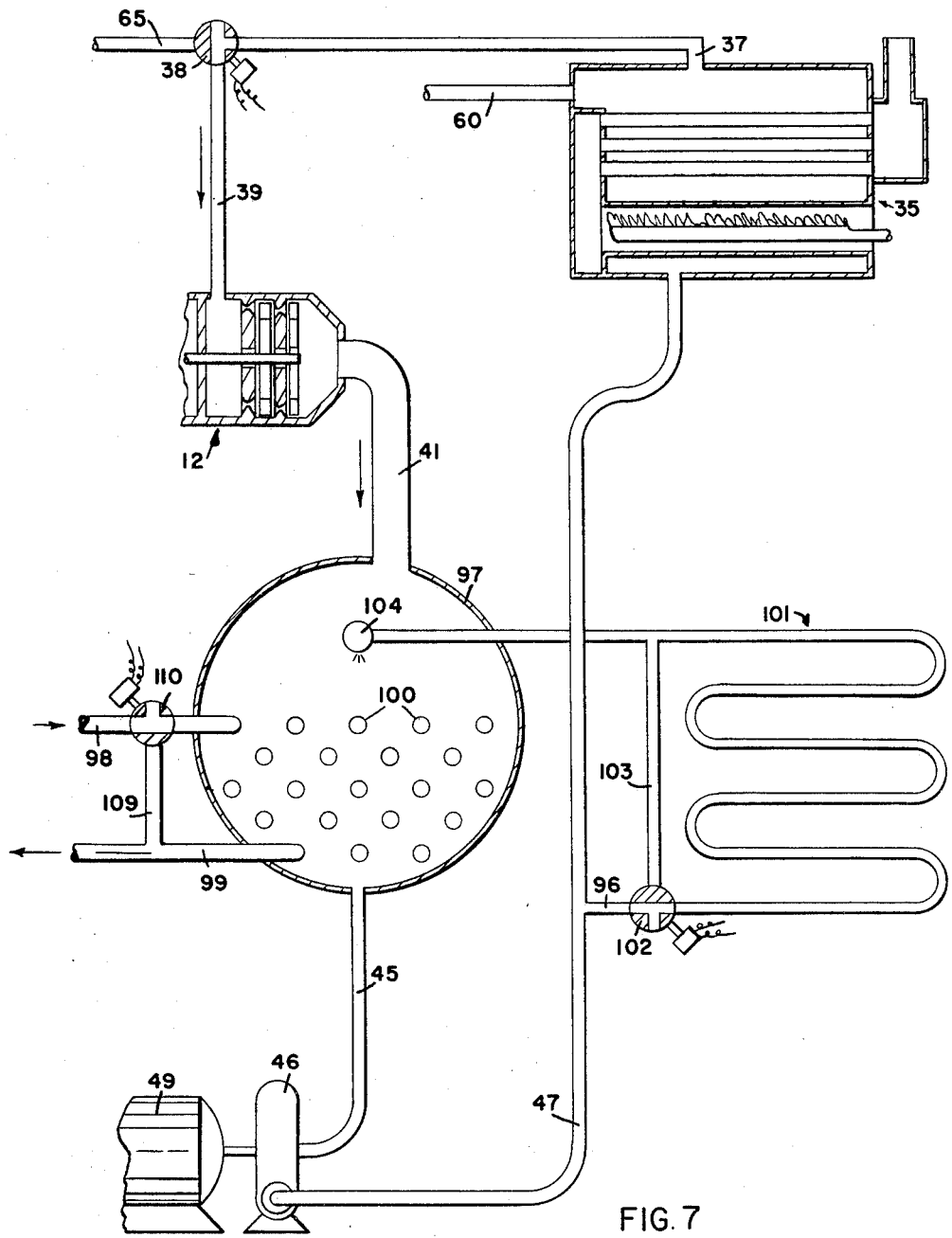
FIGURE 7 is a schematic illustration partly in cross-section illustrating a modification which utilizes a spray type steam condenser and a circuit arrangement for providing reheat.

FIGURE 7 illustrates a means of providing reheat when it is desired to accurately control humidity in the conditioned region. A spray type steam or other power fluid condenser 97 is connected to outlet 41 of turbine. Condensed steam is forwarded by pump 46 through lines 45 and 47 back to boiler 35. A portion of the condensed steam is diverted through line 96 to bypass valve 102. From bypass valve 102, the condensed steam is forwarded either through reheat heat exchanger 101, which is located downstream of heat exchanger 29, or through line 103 directly to spray header 104 of spray type steam condenser 97. Steam entering steam condenser 97 through line 41 contacts the water sprayed into the steam condenser through header 104 and condenses by direct contact with the spray. Excess heat is removed from the water in passing over tubes 100 of the tube bundle in the steam condenser. Inlet line 98 and outlet line 99 are provided to pass cooling water such as from a cooling tower through the tubes in the bundle to remove the excess heat of condensation from condenser 97. Bypass valve 102 controls whether condensate from line 96 passes through reheat coil 101 or through bypass line 103 to spray header 104. When reheat is desired, valve 102 passes condensate from line 96 through reheat coil 101.

During normal operation, a quantity of liquid condensate is present in steam condenser 97 and pump 46 forwards sufficient condensate through line 47 to maintain the desired level of liquid in boiler 35. Exhaust steam or other power fluid from turbo-compressor 12 is placed in direct contact with relatively cool condensate discharged through spray header 104 and the power fluid condenses into the spray of liquid. Consequently, the latent heat of the exhaust steam from turbo-compressor 12 is transferred to sensibly heat the liquid in condenser 97. This latent heat is, therefore, partially utilized by passage of the condensate to reheat heat exchanger 101 when desired, or is returned to boiler 35 to economize the fuel of other heat source input requirement to the boiler. The cooling water supplied to tube bundle 100 removes only the excess heat which is required to be removed to maintain the fluid in condenser 97 in a liquid state. In order to minimize the subcooling of this liquid, a bypass line 109 and bypass valve 110 is provided to divert cooling water around tube bundle 100 when cooling of the condensate in condenser 97 is not required.

It will be apparent that the direct contact type steam condenser described not only provides a ready means for recapturing some of the latent heat of the turbine exhaust, but also provides a convenient way of obtaining reheat without imposing an additional steam or power input requirement on the boiler. It will also be apparent that the reheat system and the direct contact type condenser described may be utilized in other types of refrigeration systems wherein a vapor is condensed for subsequent re-use, as in an absorption refrigeration system where refrigerant vapor from the generator is required to be condensed.

While a steam driven turbo-compressor is particularly advantageous for the purposes of this invention, it will be understood that an electrically driven centrifugal, reciprocating or rotary compressor may also be utilized by appropriate system modifications. Under these circumstances, the boiler and steam condenser may be omitted if it is not desired to provide heating or reheat. If it is desired to provide a complete heating and cooling system or to provide reheat, a heat input may be used in conjunction with an electrically driven system and the system may be readily modified to accommodate this type of operation.

It can be seen by the foregoing description that the refrigeration system described is capable of providing both heating and cooling to a region to be conditioned thereby especially adapting it to use in air conditioning applications. The system may be an entirely self-contained hermetic unit since both turbo-compressor 12 and pumps 27 and 46 are readily sealed from the atmosphere. The entire unit, with the exception of heat exchanger 29, is adapted to be installed on the roof of a building or other desired location, and the circuit components may be readily sized to provide the desired degree of heating irrespective of the compressor size, thereby eliminating the necessity of an additional winter heating system in the building being conditioned.

A significant advantage of the system herein described lies in its adaptability to either air or water cooled condensing applications thereby rendering the necessity for a cooling tower optional. The initial cost of a system constructed in accordance with this invention is significantly reduced by the reduction in heat exchange surface required through the use of a direct contact type evaporator and the elimination of an operating purge through utilization of a completely hermetic system.

While this system has been specifically described with respect to a preferred embodiment thereof, it will be understood that various modifications may be made in the system and its components without departing from the spirit and scope of the invention. For example, other refrigerants and combinations of refrigerants, heat exchange liquids and power fluids having the described properties may be utilized if desired.

Various other modifications and embodiments of this invention within the scope of the following claims will be readily apparent from the foregoing description to those skilled in the art.

I claim:

1. A refrigeration system comprising in combination a direct contact type evaporator vessel, heat exchange liquid being cooled in said vessel by direct contact with refrigerant liquid, said refrigerant liquid being substantially immiscible with said heat exchange liquid, means for maintaining a substantially predetermined pressure in said evaporator vessel, a condenser for liquefying refrigerant vapor, means to return liquefied refrigerant from said condenser to said direct contact evaporator vessel for re-evaporation thereof, said heat exchange liquid being in heat exchange relation with a load to be cooled, and means to mix said heat exchange liquid with said liquefied refrigerant to provide a relatively large area of mutual surface contact for heat transfer to take place therebetween in said evaporator vessel, said heat exchange liquid comprising water and said refrigerant comprising octafluorocyclobutane 2. A refrigeration system as defined in claim 1 wherein the means to mix the heat exchange liquid and the liquefied refrigerant comprises a jet ejector adapted to mix the refrigerant liquid with the heat exchange liquid.

3. A refrigeration system as defined in claim 2 wherein said jet ejector is arranged in said system so as to further comprise a restriction device to govern return of refrigerant from said condenser to said direct contact evaporator vessel.

4. A heat operated refrigeration system comprising in combination a boiler containing a liquid power fluid, means for supplying heat to liquid power fluid in said boiler to vaporize said power fluid, a turbo-compressor, means to pass vaporized power fluid from said boiler to a turbine section of said turbo-compressor to provide power to drive said turbo-compressor, means to replenish the supply of power fluid in said boiler, a direct contact evaporator vessel containing a refrigerant liquid and a heat exchange liquid, means including a compressor section of said turbo-compressor, to withdraw refrigerant vapor from said evaporator vessel and maintain a pressure in said evaporator vessel sufficiently low to allow refrigerant liquid to vaporize therein and chill said heat exchange liquid, condenser means to liquefy refrigerant vapor withdrawn from said evaporator vessel by said turbo-compressor, means to return refrigerant liquid from said condenser means to said evaporator vessel for re-evaporation thereof, said chilled heat exchange liquid being in heat exchange relation with a load to be cooled, and means to mix refrigerant liquid and heat exchange liquid to provide a large area of mutual surface contact for heat transfer to take place by direct contact in said evaporator vessel, said power fluid for driving said turbo-compressor and said heat exchange liquid both comprising substantially the same material so that some leakage of power fluid or refrigerant through said turbine may be tolerated.

5. A heat operated refrigeration system as defined in claim 4 further including means to automatically return refrigerant from the turbine side of said system to the compressor side of said system.

6. A heat operated refrigeration system as defined in claim 4 further including means to automatically return refrigerant from the turbine side of said system to the compressor side thereof, and means to automatically return power fluid from the compressor side of said system to the turbine side thereof so that adequate quantities of said fluids are maintained on the respective sides of the system.

7. A heat operated refrigeration system as defined in claim 4 wherein said power fluid and said heat exchange liquid comprise water and said refrigerant liquid comprises octofluorocyclobutane.

8. A heat operated refrigeration system as defined in claim 4 including selectively operable means to substantially discontinue return of said refrigerant liquid from said condenser means to said evaporator vessel and to supply power fluid directly from said boiler to said direct contact evaporator vessel to heat the heat exchange liquid in said evaporator vessel and thereby supply heat to said region to be conditioned when desired.

9. A heat operated refrigeration system as defined in claim 4 wherein said turbo-compressor has a bearing and including means to pass one of said system liquids to said turbo-compressor bearing for lubrication thereof.

10. A heat operated refrigeration system as defined in claim 9 further including a shaft seal on the compressor side of said turbo-compressor and a shaft seal on the turbine side of said turbo-compressor, said seals being spaced from each other, and means to withdraw refrigerant vapor, heat exchange liquid and power fluid from a region between said seals and return the same to the system.

11. A heat operated refrigeration system as defined in claim 4 wherein said turbo-compressor has a bearing, and including means to pass cooled heat exchange liquid from said direct contact evaporator to said bearing for lubrication thereof.

12. In a system for selectively providing heating or cooling to a load to be tempered, the combination of a direct contact evaporator vessel adapted to contain a heat exchange liquid for tempering the load, and a refrigerant liquid immiscible with said heat exchange liquid, means to mix said heat exchange liquid and said refrigerant liquid, a compressor for withdrawing refrigerant vapor from said evaporator vessel when cooling of said load is desired, a condenser for liquefying compressed refrigerant vapor, means to return liquefied refrigerant from the condenser to the evaporator vessel, and means to selectively render said compressor effectively inoperative for withdrawing refrigerant vapor from said evaporator vessel and to supply heat to said direct contact evaporator vessel to heat the heat exchange liquid therein when it is desired to provide heat to the load to be tempered.

13. A system for selectively providing heating or cooling of a region to be conditioned as defined in claim 19, ard a power side including a boiler adapted to contain a power fluid, means to heat said power fluid in said boiler, a turbine for driving said compressor, said turbine being adapted to be driven by said heated power fluid from said boiler, and wherein said means to supply heat to said direct contact evaporator vessel comprises means to supply heated power fluid from said boiler to said direct contact evaporator vessel to heat the heat exchange liquid therein.

14. A system for selectively providing heating or cooling of a region to be conditioned as defined in claim 13 including means to return power fluid from said evaporator vessel to said boiler to maintain an adequate supply of power fluid in said boiler.

15. A system for selectively providing heating or cooling of a region to be conditioned as defined in claim 14 further including means to return refrigerant from the boiler side of said system to the evaporator vessel side thereof to maintain an adequate supply of refrigerant on the latter side of the system for cooling said heat exchange liquid when desired.

16. A system for selectively providing heating or cooling of a region to be conditioned as defined in claim 13 wherein said power side provides means for using a power fluid essentially the same as said heat exchange liquid, so that said turbine need not be completely sealed from said compressor.

17. A refrigeration system comprising in combination a direct contact type evaporator vessel containing octofluorocyclobutane refrigerant and a heat exchange liquid in direct contact heat exchange relationship for tempering the heat exchange liquid, said heat exchange liquid being substantially immiscible with said liquid octofluorocyclobutane refrigerant, vapor withdrawing means for withdrawing octofluorocyclobutane vapor from said evaporator vessel and maintaining a substantially predetermined vapor pressure in said evaporator vessel to enable said refrigerant to vaporize therein, a condenser to liquefy octofluorocyclobutane vapor withdrawn from said evaporator vessel, means to return refrigerant liquid from said condenser back to said evaporator vessel for re-evaporation of said refrigerant in said evaporator vessel, means for associating said heat exchange liquid tempered in said evaporator vessel with a load to be tempered, and means to mix said heat exchange liquid with said refrigerant liquid to provide a relatively large area of surface contact therebetween for heat transfer to take place in said evaporator vessel.

18. A system for selectively heating and cooling a region to be conditioned comprising in combination a direct contact evaporator adapted to contain a heat exchange liquid and a refrigerant, a turbo-compressor, said turbo-compressor having a compressor section and a turbine section, means to pass refrigerant vapor withdrawn from said direct contact evaporator to said compressor section of said turbo-compressor, a condenser to liquefy refrigerant vapor withdrawn from said evaporator by said compressor, means to return refrigerant from said condenser to said direct contact evaporator, means to mix refrigerant liquid passed from said condenser with heat exchange liquid to provide a large area of surface contact for heat transfer to take place therebetween, means to pass heat exchange liquid from said direct contact evaporator to a heat exchanger for tempering said region to be conditioned, means to return said heat exchange liquid from said heat exchanger to said direct contact evaporator, a boiler adapted to contain additional heat exchange liquid, means to supply heat to heat exchange liquid in said boiler to vaporize it, means to supply vaporized heat exchange liquid from said boiler to said turbine section of said turbo-compressor to drive said compressor for cooling said region to be conditioned, and means to selectively supply said direct contact evaporator with vaporized heat exchange liquid from said boiler in lieu of said refrigerant to provide heated heat exchange liquid for heating said region to be conditioned when desired.

19. A refrigeration system for providing heating and cooling of a region to be conditioned comprising in combination a direct contact evaporator adapted to contain a heat exchange fluid in heat exchange relation with a load to be tempered, and a refrigerant; a hermetic turbo-compressor, said turbo-compressor having a compressor section and a turbine section, seal means between said compressor section and said turbine section of said turbo-compressor to inhibit leakage from one section to the other, means to pass refrigerant vapor from said direct contact evaporator to said compressor section of said turbo-compressor, a condenser adapted to liquefy refrigerant vapor withdrawn from said evaporator by said compressor, means to return liquefied refrigerant from said condenser to said direct contact evaporator, means to mix refrigerant passed fom said condenser with heat exchange fluid to provide a large area of surface contact therebetween, said heat exchange fluid being in heat exchange relation with a fluid to be tempered, a boiler adapted to contain additional heat exchange fluid, means to supply heat to heat exchange fluid in said boiler to vaporize it, means to supply vaporized heat exchange fluid to said turbine section of said turbo-compressor to provide power to drive said compressor, means to selectively supply vaporized heat exchange fluid from said boiler to said direct contact evaporator to provide heated heat exchange fluid therein when it is desired to supply heat to the region to be conditioned, a second condenser to condense vaporized heat exchange fluid discharged from said turbine section of said turbo-compressor, means to return condensed heat exchange fluid from said second condenser to said boiler for revaporization thereof, means to return refrigerant accumulated on the turbine side of said system to the compressor side thereof, and means to return excess heat exchange fluid accumulated on one side of said system to the other side thereof to maintain predetermined desired quantities of heat exchange fluid on the respective sides of said system.

20. A refrigeration system as defined in claim 19 wherein said seal means includes spaced apart seals, a shaft bearing disposed between said seals, means to provide a relatively low pressure region between said seals, means to supply one of said fluids to lubricate said bearing, and means to drain the lubricant fluid from the low pressure region between said seals and return it for reuse in the system.

21. A refrigeration system as defined in claim 19 wherein said means to return refrigerant accumulated on the turbine side of said system comprises a venturi tube in series with a fluid flow line on the compressor side of the system, said venturi tube having a low pressure throat region, and a line joining the low pressure region of said venturi tube to said second condenser so that refrigerant vapor accumulated in the second condenser is induced through said line and said throat into the compressor side of the system.

22. A refrigeration system as defined in claim 19 wherein said seal means includes spaced apart seals, means to provide a relatively low pressure region between said seals for collection of fluids leaking past said seals, and means to return fluids leaking past said seals from said low pressure region for reuse in the system.

23. A method of operating a heat powered refrigeration system comprising the steps of mixing refrigerant liquid and a heat exchange liquid, vaporizing refrigerant from the resulting mixture to cool the heat exchange liquid fraction thereof, withdrawing and compressing the vaporized refrigerant by operation of a compressor section of a turbo-compressor, condensing evaporated refrigerant vapor by removing heat therefrom, returning the condensed refrigerant for remixing and re-evaporation therof, passing heat exchange liquid cooled by heat exchange with said refrigerant to a heat exchanger to cool a refrigeration load, vaporizing additional heat exchange liquid in a boiler, passing vaporized heat exchange liquid from the boiler to a turbine sectioin of said turbo-compressor to provide power to operate said compressor section thereof, passing refrigerant vapor accumulated on the turbine side of said system back to the compressor side of said system and passing excess heat exchange liquid accumulated on the compressor side of said system back to the turbine side of said system so that leakage of refrigerant and heat exchange fluid through said turbine does not substantially adversely affect operation of said system.

24. A method of operating a heat powered refrigeration system as defined in claim 23 including the additional step of passing one of said liquids to a bearing in said turbo-compressor to provide lubrication thereof.

25. A method of operating a heat powered refrigeration system as defined in claim 23 further including the steps of maintaining a low pressure region between the turbine section and the compressor section of said turbo-compressor for accumulation of fluid leaking from either side of said system, withdrawing fluid accumulated in said low pressure region, and returning said last named fluid for reuse in the system.

26. A method of operating a heat powered refrigeration system as defined in claim 23 including the step of selectively passing the vaporized heat exchange liquid from said boiler to a vessel containing heat exchange liquid, condensing said vaporized heat exchange liquid in said vessel to mix with and heat the heat exchange liquid therein, and passing heated heat exchange liquid from said vessel to said heat exchanger to provide heat to said load when desired.

27. A method as defined in claim 23 wherein the refrigerant accumulated on the turbine side of said system is automatically induced into the compressor side of the system by passing the vaporized refrigerant through a low pressure throat portion of a venturi tube located in a fluid line on the compressor side of the system.

28. A method of operating a heat powered refrigeration system comprising the steps of mixing a refrigerant liquid and a heat exchange liquid, vaporizing refrigerant from the resulting mixture to cool the heat exchange liquid fraction therof, withdrawing and compressing the vaporized refrigerant by operation of a compressor section of a turbo-compressor, condensing evaporated refrigerant vapor by removing heat therefrom, returning the condensed refrigerant for re-association and re-evaporation thereof, passing a fluid to be cooled in heat exchange relation with said cooled heat exchange liquid, vaporizing additional heat exchange liquid, passing the last said vaporized heat exchange liquid to a turbine section of said turbo-compressor to provide power to operate said compressor section thereof, and passing heat exchange liquid to a bearing of said turbo-compressor to cool and lubricate said bearing.

29. In a method of operating a heat powered heating and coling system of the type employing a turbo-compressor and having a direct contact type evaporator containing a heat exchange fluid in heat exchange relation with a load to be cooled, the steps of vaporizing a power liquid; passing vaporized power liquid to the turbine section of said turbo-compressor to provide power for driving the compressor section thereof thereby evaporating and withdrawing refrigerant from said direct contact evaporator to cool the heat exchange fluid therein; associating the heat exchange fluid in heat exchange relation with a material to be tempered; and selectively supplying vaporized power liquid to said direct contact evaporator to heat the heat exchange fluid therein.

30. A method of operating a turbine driven air conditioning system consisting in the steps of vaporizing a power fluid, passing vaporized power fluid to the turbine section of a turbo-compressor to supply power to drive said compressor, mixing a heat exchange liquid with a refrigerant liquid, vaporizing said refrigerant liquid to cool the heat exchange liquid and withdrawing the refrigerant vapor by means of said compressor, cooling air to be conditioned below the desired temperature and below its dew point thereby condensing moisture from said air to be conditioned to dehumidify it by passing said air in heat exchange relation with cooled heat exchange liquid, condensing the vaporized power fluid by passing power fluid to a reheat heat exchanger, and passing said dehumidified air in heat exchange relation with said liquid power fluid passing through said reheat heat exchanger to reheat said dehumidifier air.

31. An air conditioning construction comprising a unitary housing, a turbo-compressor, a power fluid boiler, a power fluid condenser, and a refrigerant condenser, said refrigerant condenser being located along at least one side of said unitary housing, said power fluid condenser being located adjacent said refrigerant condenser and inwardly thereof in said housing, means to pass ambient air through said side of said housing, and air moving means in said housing for passing ambient air in heat exchange relation first with said refrigerant condenser and then in heat exchange relation with said power fluid condenser.

32. An air conditioning construction as defined in claim 31 wherein said housing has two sides provided with means to pass air therethrough, said power fluid condenser and said refrigerant condenser both comprising a pair of sections, one section of both of said condensers being disposed along one of said sides of said housing, and the other section of both of said condensers being disposed along the other of said sides of said housing so that said air moving means serves to pass air in heat exchange with each of said condenser sections.

33. A refrigeration system comprising a refrigerant condenser, an evaporator, compressor means for withdrawing refrigerant from said evaporator and passing the withdrawn refrigerant to said refrigerant condenser, means for passing the refrigerant from said refrigerant condenser to said evaporator, steam driven drive means for operating said compressor means, steam condenser means to receive steam discharge from said drive means and refrigerant leaking from the compressor means, means for withdrawing steam condensate from said steam condenser means and returning the condensate for reuse in the system, and means for withdrawing the refrigerant from said steam condenser means and returning it to the compressor side of said system for reuse in the system.

34. A method of operating a refrigeration system comprising the steps of mixing a refrigerant fluid and a power fluid, vaporizing the refrigerant from the resulting mixture, withdrawing and compressing the vaporized refrigerant by operation of a compressor section of a turbocompressor, condensing the compressed refrigerant vapor by removing heat therefrom, returning the condensed refrigerant for remixing and re-evaporation therof, vaporizing additional power fluid, passing said vaporized power fluid to a turbine section of said turbo-compressor to provide power to operate said compressor section thereof, returning refrigerant accumulated on the turbine side of said system to the compressor side of the system and returning power fluid accumulated on the compressor side of said system to the turbine side of the system so that any leakage of refrigerant fluid or power fluid through said turbo-compressor does not substantially adversely affect operation of said system.

35. A heating and cooling apparatus comprising: an evaporator, a fluid compressor, a prime mover connected to said compressor, a heat source, a first conduit circuit coupled to said heat source and said evaporator, said first conduit circuit including valve means for selectively interconnecting said heat source and said evaporator, a heating fluid conducted by said first conduit circuit, a second conduit circuit coupled to said heat source and said prime mover, said second conduit circuit including valve means for selectively interconnecting said heat source to said prime mover for driving said prime mover, said heating fluid being selectively conducted to said prime mover by said second conduit circuit, a third conduit circuit coupled to said compressor and said evaporator, said third conduit circuit including valve means for selectively interconnecting said compressor and said evaporator, a cooling fluid, said cooling fluid being selectively conducted by said third conduit circuit from said compressor to said evaporator, a condenser unit in said third conduit circuit between said evaporator and said compressor, a bleeder conduit affixed to the point of connection between said prime mover and said compressor for conducting admixed fluids from said connecting point; a fluid separator, said bleeder conduit being connected to the inlet of said fluid separator, a heating fluid outlet line from said separator for conducting said heating fluid to said first conduit circuit and a cooling fluid outlet line from said separator for conducting said cooling fluid to said third conduit circuit.

36. A heating and cooling apparatus comprising: an evaporator, a fluid compressor, a prime mover connected to said compressor, a heat source, a first conduit circuit coupled to said heat source and said evaporator, said first conduit circuit including valve means for selectively interconnecting said heat source and said evaporator for conducting a heating fluid to said evaporator, a second conduit circuit coupled to said heat source and said prime mover, said second conduit circuit including valve means for selectively interconnecting said heat source to said prime mover for driving said prime mover, a third conduit circuit coupled to said compressor and said evaporator, said third conduit circuit including valve means for selectively interconnecting said compressor and said evaporator for conducting a cooling fluid from said compressor to said evaporator, a condenser unit in said third conduit circuit between said evaporator and said compressor, a bleeder conduit affixed to the point of connection between said prime mover and said compressor for conducting admixed fluids from said connecting point; a fluid separator, said bleeder conduit connected to the inlet of said fluid separator, a first fluid outlet line from said separator for conducting said heating fluid to said first conduit circuit and a second fluid outlet line from said separator for conducting said cooling fluid to said third conduit circuit.

37. A heating and cooling apparatus comprising: an evaporator; a fluid compressor; a prime mover, said prime mover and compressor being mounted upon a common shaft; a heat source, a first conduit circuit coupled to said heat source and said evaporator, said first conduit circuit including valve means for selectively interconnecting said heat source and said evaporator for conducting a heating fluid to said evaporator; a second conduit circuit coupled to said heat source and to said prime mover, said second conduit circuit including valve means for selectively interconnecting said heat source to said prime mover for driving said prime mover; a third conduit circuit coupled to said compressor and said evaporator, said third conduit circuit including valve means for selectively interconnecting said compressor and said evaporator for conducting a cooling fluid from said compressor to said evaporator, a condenser unit in said third conduit circuit between said evaporator and said compressor; a bleeder conduit connected to said common shaft between said prime mover and said compressor for conducting admixed fluids from said common shaft; a fluid separator, said bleeder conduit being connected to said fluid separator, a first fluid outlet line from said separator for conducting said heating fluid to said first conduit circuit and a second fluid outlet line from said separator for conducting said cooling fluid to said third conduit circuit.

38. A heating and cooling apparatus comprising: an evaporator; a fluid compressor; a prime mover, said prime mover and compressor being mounted upon a common shaft; a heat source, a first conduit circuit coupled to said heat source and said evaporator, said first conduit circuit including valve means for selectively interconnecting said heat source and said evaporator for conducting a heating fluid to said evaporator; a second conduit circuit coupled to said heat source and said prime mover, said second conduit circuit including valve means for selectively interconnecting said heat source to said prime mover for driving said prime mover; a third conduit circuit coupled to said compressor and said evaporator, said third conduit circuit including valve means for selectively interconnecting said compressor and said evaporator for conducting a cooling fluid from said compressor to said evaporator; a bleeder conduit connected to said common shaft between said prime mover and said compressor for conducting admixed fluids from said common shaft; a fluid separator, said bleeder conduit being connected to said fluid separator, a first fluid outlet line from said separator for conducting said heating fluid to said first conduit circuit and a second fluid outlet line from said separator for conducting said cooling fluid to said third conduit circuit; and a condenser unit having first and second sections, said first section being in said first conduit circuit between said evaporator and said heat source, said second section being in said third conduit circuit between said evaporator and said compressor.

39. In a cooling apparatus including a rotary prime mover and a rotary compressor mounted on a common shaft, wherein a refrigerant fluid is compressed by conducting it through the compressor and wherein the common shaft is rotated by a heating fluid conducted through the prime mover; means for separating admixed refrigerant and heating fluids comprising a housing defining a chamber enclosing the portion of said common shaft extending between said prime mover and said rotary compressor to confine fluids escaping from said apparatus; means for separating said admixed fluids, said separator means including an inlet port and a heating fluid outlet port and a refrigerant fluid outlet port; first conduit means coupled between said inlet port and said chamber within said housing; second conduit means coupled between said heating fluid outlet port and said prime mover; and, third conduit means coupled between said refrigerant fluid outlet port and said compressor.

References Cited
UNITED STATES PATENTS

| | | | |
|---|---|---|---|
| 479,454 | 7/1892 | Peck | 60—95 |
| 2,181,354 | 11/1939 | Winters | 165—39 |
| 2,219,815 | 10/1940 | Jones | 165—62 |
| 2,330,876 | 10/1943 | Feinberg | 165—64 |
| 2,352,930 | 7/1944 | Anderson | 165—26 |
| 2,499,076 | 2/1950 | Rosenberger | 230—11 |
| 2,512,869 | 6/1950 | McBroom | 62—500 |
| 2,684,196 | 7/1954 | Wood. | |
| 2,713,995 | 7/1955 | Arkoosh et al. | 165—28 |
| 2,797,068 | 6/1957 | McFarlan | 165—50 |
| 2,807,155 | 9/1957 | Williamitis | 62—502 |
| 2,852,922 | 9/1958 | Neumann et al. | 62—500 |
| 2,903,187 | 9/1959 | Coykendall | 237—8 |
| 2,984,987 | 5/1961 | Schlumbohm | 62—7 |
| 3,006,162 | 10/1961 | Massa | 62—500 |

FOREIGN PATENTS

| | | |
|---|---|---|
| 264,100 | 1/1927 | Great Britain. |
| 284,906 | 11/1910 | Germany. |

MEYER PERLIN, Primary Examiner

CHARLES SUKALO, Assistant Examiner

U.S. Cl. X.R.

60—95; 62—502; 165—62

PO-1050
(5/69)

UNITED STATES PATENT OFFICE
CERTIFICATE OF CORRECTION

Patent No. 3,496,992  Dated February 24, 1970

Inventor(s) Louis H. Leonard, Jr.

It is certified that error appears in the above-identified patent and that said Letters Patent are hereby corrected as shown below:

Column 11, line 56, for "19" read -- 12 --;

Column 12, line 75, and column 13, line 1, cancel "said heat exchange fluid being in heat exchange relation with a fluid to be tempered".

Column 14, line 37, for "coling" read -- cooling --; line 65, for "dehumidifier" read -- dehumidified --.

SIGNED AND
SEALED
JUL 14 1970

(SEAL)
Attest:

Edward M. Fletcher, Jr.
Attesting Officer

WILLIAM E. SCHUYLER, JR.
Commissioner of Patents